US00RE48350E

(19) United States
(12) Reissued Patent
Schwenk et al.

(10) Patent Number: US RE48,350 E
(45) Date of Reissued Patent: Dec. 8, 2020

(54) ACCESSORY DEVICE AND ASSEMBLY INCLUDING SAME FOR PROVIDING SECURE DETECTION OF THE ACCESSORY DEVICE USING DATA TRANSFER

(71) Applicant: KONINKLIJKE PHILIPS N.V., Eindhoven (NL)

(72) Inventors: Marcus Schwenk, Stuttgart (DE); Alexander Dubielczyk, Gaertringen (DE)

(73) Assignee: KONINKLIJKE PHILIPS N.V., Eindhoven (NL)

(21) Appl. No.: 14/939,179

(22) Filed: Nov. 12, 2015

Related U.S. Patent Documents

Reissue of:
(64) Patent No.: 8,583,834
Issued: Nov. 12, 2013
Appl. No.: 13/502,143
PCT Filed: Oct. 22, 2010
PCT No.: PCT/IB2010/054790
§ 371 (c)(1),
(2) Date: Apr. 16, 2012
PCT Pub. No.: WO2011/051866
PCT Pub. Date: May 5, 2011

(30) Foreign Application Priority Data

Nov. 2, 2009 (EP) ..... 09174765

(51) Int. Cl.
*G06F 3/00* (2006.01)
*H02H 11/00* (2006.01)
(Continued)

(52) U.S. Cl.
CPC ..... *H01R 13/7039* (2013.01); *H01R 13/44* (2013.01); *H01R 2201/12* (2013.01)

(58) Field of Classification Search
CPC . H01R 13/44; H01R 2201/12; H01R 13/7039
(Continued)

(56) References Cited

U.S. PATENT DOCUMENTS 5,400,267 A * 3/1995 Denen ..... A61B 17/00 128/908
5,902,412 A 5/1999 Taylor
(Continued)

FOREIGN PATENT DOCUMENTS

DE 202005006373 8/2006
DE 202005006373 U1 8/2006
(Continued)

*Primary Examiner* — B. James Peikari

(57) ABSTRACT

The invention relates to an assembly comprising a main device and an accessory, which can be connected by a safe connector and a safe detection method. According to the invention, the assembly comprises: —a main device (2), —an accessory (3) connectable to the main device (2), —the accessory (3) comprising an accessory connector (4) for mating with a device connector (5) of the main device (2), —the accessory connector (4) and the device connector (5) each comprising one or more supply contacts (7) for transmitting electric power from the main device (2) to the accessory (3), —the main device (2) comprising a detection device (9), which, if connecting the accessory (3) to the main device (2), receives complex accessory data stored by the accessory (3) and which by positive evaluation of the complex data enables applying a supply voltage at the one or more supply contacts (7) of the device connector (5).

22 Claims, 1 Drawing Sheet

(51) Int. Cl.
*H01R 13/703* (2006.01)
*H01R 13/44* (2006.01)

(58) Field of Classification Search
USPC ..... 307/326, 328; 439/13
See application file for complete search history.

(56) References Cited

U.S. PATENT DOCUMENTS

| | | | | |
|---|---|---|---|---|
| 5,905,372 | A * | 5/1999 | Kuffner | G06K 7/0008 323/356 |
| 5,987,350 | A | 11/1999 | Thurston | |
| 6,305,944 | B1 * | 10/2001 | Henry | E21B 17/01 439/13 |
| 6,829,547 | B2 | 12/2004 | Law | |
| 6,902,412 | B2 | 6/2005 | Higgins | |
| 7,131,139 | B1 * | 10/2006 | Meier | G06F 21/35 726/4 |
| 7,297,115 | B2 | 11/2007 | Bates et al. | |
| 7,532,492 | B2 | 5/2009 | Dobyns | |
| 7,948,246 | B2 | 5/2011 | Agevik | |
| 8,112,567 | B2 | 2/2012 | Lydon | |
| 2005/0048816 | A1 | 3/2005 | Higgins | |
| 2005/0184856 | A1 | 8/2005 | Pourchot | |
| 2007/0149013 | A1 * | 6/2007 | Eastham et al. | 439/140 |
| 2009/0219142 | A1 * | 9/2009 | Ku et al. | 340/10.3 |
| 2009/0263999 | A1 * | 10/2009 | Onoue | 439/215 |

FOREIGN PATENT DOCUMENTS

| | | | |
|---|---|---|---|
| EP | 1912125 | | 4/2008 |
| EP | 1912125 | A1 | 4/2008 |
| JP | 2006031259 | | 2/2006 |
| JP | 2007257128 | | 10/2007 |
| JP | 2008099434 | | 4/2008 |
| JP | 2009195014 | | 8/2009 |
| WO | 2007072581 | | 6/2007 |
| WO | 2007072581 | A1 | 6/2007 |
| WO | 2009086937 | | 7/2009 |
| WO | 2009086937 | A1 | 7/2009 |

* cited by examiner

ACCESSORY DEVICE AND ASSEMBLY INCLUDING SAME FOR PROVIDING SECURE DETECTION OF THE ACCESSORY DEVICE USING DATA TRANSFER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention relates to an assembly comprising a main device and an accessory, which can be connected by a safe connector and a safe detection method.

BACKGROUND OF THE INVENTION

In the field of patient monitoring, assemblies comprising a medical main device, for example, a measurement device, and one or more accessories devices, for example, cables and sensors, are adapted to conduct measurements at the specific location at the patient. Cables and sensors are often designed for one time use or need to be cleaned or sterilised after usage. Therefore, these accessories must be detachable from the main device. A connector provides mechanical stability and electrical connections for data or power flow or material flow from the accessory to the measurement device.

It is known to use plug and socket arrangements for mechanical and electrical connection. Typically connectors are build and optimized for different purposes: providing a detachable mechanical joint, providing mechanical stability when connected, protecting electrical contacts from environmental conditions (humidity, dirt, corrosion, destruction), and protecting a person from potential harm caused by touching electrical contacts. In the field of medical devices the last point needs special attention. A patient or person might not be able to disengage himself from a hazardous device. During surgery exposed tissue might be more vulnerable than usual. Legal regulations for medical devices covering this topic must be obeyed.

U.S. Pat. No. 6,902,412 B2 discloses an assembly, comprising a mobile phone and an accessory connectable to the mobile phone. The mobile phone and the accessory each comprise a supply contact and a detect contact. If disconnected, no voltage is applied at the supply contact of the main device. If connected, a voltage is applied at the supply contact of the main device, supplying the accessory with electric power. The different states are detected by a detection circuit of the mobile phone. A low voltage is applied at the detect contact of the main device. While connecting the accessory to the mobile phone, the accessory detect contact touches the detect contact of the main device, leading to a change of logic state inside the detection device, which enables applying a voltage at the supply contact. The supply contact of the accessory is longer than the detect pin, so that the supply contacts are touching each other before the detect contacts are getting into contact. Therefore, voltage is applied at the supply contact only after the supply contacts are in contact, minimizing or preventing the causing of sparks.

However, known methods for detecting an accessory have several disadvantages. Environmental conditions (water, moisture, dirt) can disturb the quality and reliability of the method. Furthermore, mechanical deformations, accidental or willing misuse can lead to false detection.

SUMMARY OF THE INVENTION

It is an object of the invention to provide an assembly, comprising a main device and an accessory device, connectable to the main device, which allows [save] *safe* detection of the accessory before applying a supply voltage at a supply contact of the main device.

According to the invention the assembly comprises:

a main device, an accessory connectable to the main device, the accessory comprising an accessory connector for mating with a device connector of the main device, the accessory connector and the device connector each comprising one or more supply contacts for transmitting electric power form the main device to the accessory, the main device comprising a detection device, which, if connecting the accessory to the main device, receives complex accessory data stored by the accessory and which by positive evaluation of the complex data enables applying a supply voltage at the one or more supply contacts of the device connector.

It is a further object of the invention to provide a method for connecting an accessory to a main device, wherein the accessory comprises an accessory connector for mating with a device connector of the main device, the accessory connector and the device connector each comprise one or more supply contacts for transmitting electric power from the main device to the accessory, the main device comprises a detection device, the method including the steps:

if connecting the accessory to the main device, transmitting complex accessory data stored by the accessory to the detection device, evaluation of the complex data, if the evaluation of the complex data is positive, enabling applying a supply voltage at the one or more supply contacts of the device connector.

Under the term "complex accessory data" such kind of data is understood, w includes information, which allows to check if the data has been received without error. If the complex accessory data is digital data, such an information could be, for example, a checksum or a hash sum.

Under the term "positive evaluation" a result of an evaluation is understood, that indicates, that the accessory is authenticated.

The transfer of complex data between device and an applicable accessory part allows detection of the accessory with high reliability, preventing applying a supply voltage at the supply contact in unwanted situations, for example, in case of disturbances or misuse. Patient or user safety is improved. Furthermore, the transfer of complex accessory data can be used to eliminate environmental disturbances at the detection site, such as dirt, humidity and/or electromagnetic disturbances, to eliminate effects of degraded electrical contacts, to eliminate the possibility of accidental false detection, to eliminate the possibility of willing misuse, to ensure that an accessory part is mounted correctly, and to ensure that the accessory part is of the correct type.

The transferring of the data from the accessory to the detection device can occur during connecting of the accessory to the main device, after connecting and/or continuously while the accessory is connected to the main device.

It is preferred, that the complex accessory data includes data, which is characteristic for the accessory, allowing to detect if the connected accessory is an acceptable accessory. Furthermore, the complex accessory data may include control data for controlling the accessory device, for example, the height of the supply voltage.

Preferably, the data is digital data and has a minimum size of e.g. 16 bits. Furthermore, the complex accessory data can be coded.

The assembly according to the invention is especially suited for medical applications.

In a preferred embodiment, the accessory connector and the device connector each comprise one or more detect contacts, wherein the complex accessory data is transmitted over the connected detect contacts of the accessory and the main device.

Complex accessory data can be stored in different ways by the accessory, for example as a bar code, as an RFID (radio frequency identification) tag, as printed data, as geometric data (by providing at least a part of the accessory with a characteristic shape), as a defined mechanical resonance frequency, or by means of an electric or electronic component, for example, a memory. For accessing these accessory data, the detection device could comprise a scanner, an electric circuit, a microcontroller or other devices adapted to receive the accessory data from the different storage mediums. However, to keep the detection method simple and robust, transferring the accessory data by detect contacts is preferred.

In a further preferred embodiment, the complex accessory data is stored in an accessory memory. Preferably, the memory is a non-volatile memory, for example ROM, EPROM, EEPROM or FLASH.

In a further preferred embodiment, the accessory comprises an accessory controller wherein, if connecting the accessory to the main device, main device data is transmitted from the detection device to the accessory controller, the accessory controller evaluating the main device data and transmitting the complex accessory data to the detection device.

The accessory controller allows a two-sided data transfer between the main device and the accessory. The main device data can be, for example, a request to transmit the complex accessory data to the detection device.

In a further preferred embodiment, when connecting the accessory to the main device, the detection device receives first accessory data stored by the accessory and, after receiving and evaluating the first data, receives second accessory data stored by the accessory, and, by positive evaluation of at least the second accessory data, enables applying a voltage at the supply contact of the device connector, wherein at least the second data is complex accessory data.

In a further preferred embodiment, the detection device receives the second accessory data if the evaluation of the first accessory data is positive.

Using at least two detection steps for detecting the accessory enhances the reliability of the detection. As a first step, a detection method with moderate reliability but with low power consumption can be used. In following steps, detection methods with higher power consumption but with higher reliability can be implemented. Executing at least two detection steps sequentially allows to save power.

In a further preferred embodiment, the first accessory data is stored in at least one electric or electronic component. The electric component can be an impedance, an inductance, a capacitor or a circuit including several of such elements. The characteristic values of these elements can be used to define accessory data. The advantage of using such elements for storing accessory data is that the characteristic values of such elements could be measured with low power consumption.

In a further preferred embodiment, the accessory and the main device each comprise a second detect contact, wherein the first accessory data is transmitted by the connected first detect contacts and the second accessory data is transmitted by the connected second detect contacts of the main device and the accessory.

In a further preferred embodiment, the detection device comprises a first detection circuit for receiving the first accessory data and a second detection circuit for receiving the second accessory data.

Using different detect contacts and different detection circuits allows to easily combine different detection methods.

In a further preferred embodiment, the accessory comprises a sensor circuit, the main device comprises a measurement circuit, and the accessory and the main device each comprise a measurement contact, wherein by connecting of the accessory to the main device, the measurement contacts are connected, enabling transmitting of measurement data from the sensor circuit to the measurement circuit.

In a further preferred embodiment, the main device comprises a controller for controlling the detection device, the measurement circuit and/or a power supply for applying a supply voltage at the supply contact of the main device.

In a further preferred embodiment, at least the supply contact of the main device is an exposed contact touchable by hand.

BRIEF DESCRIPTION OF THE DRAWINGS

These and other aspects of the invention will be apparent from and elucidated with reference to the embodiments described hereinafter.

In the drawings.

DETAILED DESCRIPTION OF EMBODIMENTS

Figure 1:
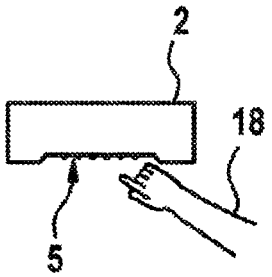
FIG. 1 is a schematic view of a main device of an embodiment of an assembly according to the invention.
Figure 2:
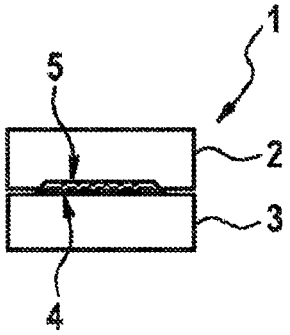
FIG. 2 is a schematic view of the whole assembly, which comprises the main device shown in FIG. 1 and an accessory, wherein the accessory is connected to the main device.
Figure 3:
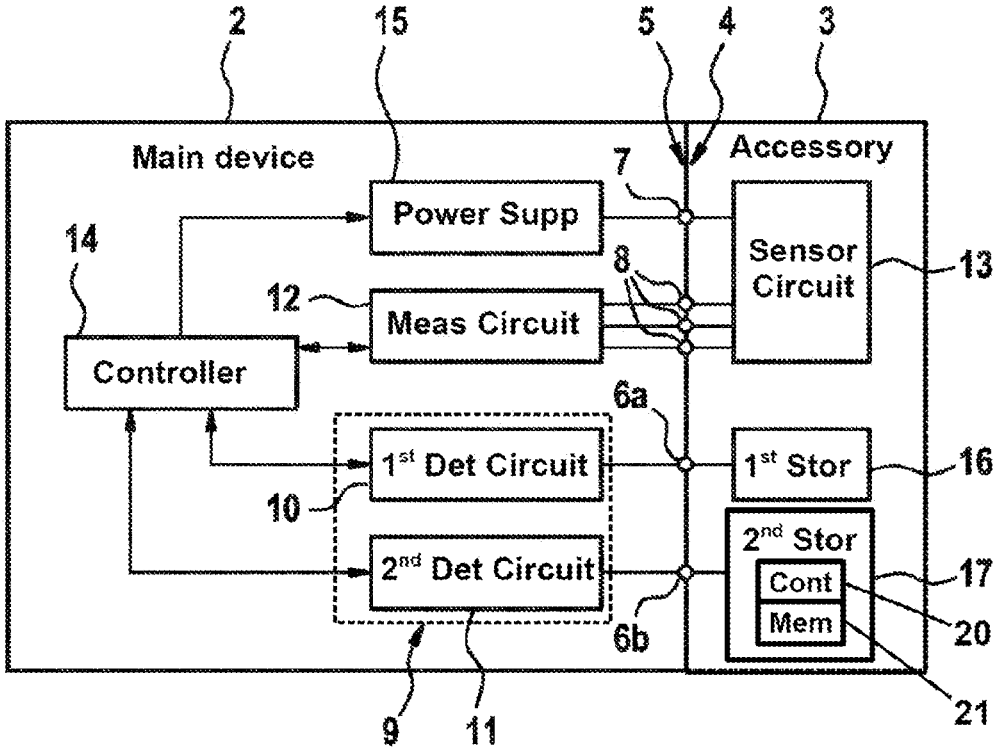
FIG. 3 is a more detailed view of the assembly shown in FIG. 2.

FIGS. 1 to 3 display an embodiment of an assembly 1 according to the invention.

The assembly 1 comprises a main device 2 and an accessory 3. The main device 2 comprises a main device connector 5, the accessory 3 comprises an accessory connector 4, allowing to connect the accessory 3 to the main device 2 by mounting the accessory 3 on the main device 2, or allowing to disconnect a mounted accessory 3 from the main device 2. The mounted accessory 3 covers the electrical contacts of the main device connector 5, which would be otherwise exposed or touchable by hand.

FIG. 3 displays the main device 2 and the accessory 3 in more detail.

The medical device comprises a detection device 9 comprising a first detection circuit 10 and second detection circuit 11, a power supply 15, a measurement circuit 12 and a controller 14. The controller 14 controls the power supply 15, the detection device 9 and the measurement circuit 12. The accessory comprises a sensor circuit 13, a first storage medium 16 and a second storage medium 17. The main device 2 and the accessory 3 each comprise a supply contact 7 for transmitting electric power from the main device 2 to the accessory 3, several measurement contacts 8 for transmitting data or power between the measurement circuit 12 and the sensor circuit 13, and a first detect contact 6a and a second detect contact 6b for connecting the first detection circuit 10 to the first storage medium 16 and the second detection circuit 11 to the second storage medium 17, respectively. Measurement contacts 8 can also be formed to transfer material flow between the accessory 3 and the main device 2.

First accessory data is stored in the first storage medium 16, second accessory data is stored in the second storage medium 17. In this embodiment, the first storage medium 16 is an impedance, the first accessory data is the characteristic value of the impedance. The second storage medium 17 is a non-volatile digital memory, the second accessory data is complex digital data stored in the memory. The second complex accessory data has a size of at least 16 bits and at least comprises characteristic information about the accessory, for example, an identification or type number, and, furthermore, a checksum.

By means of the first detection circuit 10 a small detection voltage is continuously or intermittently applied at the first detect contact 6a of the main device 2. When connecting the accessory 3 to the main device 2, the first detect contacts 6a of the main device 2 and the accessory 3 get into contact, leading to a change of impedance. In a first detection step, the impedance is evaluated by means of the first detection circuit 10 by comparing the measured impedance to a predetermined impedance. If the impedance detected by the first detection circuit lies within predetermined tolerance limits, a positive result is transmitted to the controller 14 and the controller 14 initiates a second detection step. If the change of impedance is not within the predetermined tolerance limits, a negative result can be sent to the controller 14. This negative result can be used to indicate that the connection was not successful.

In the second detection step, the controller 14 activates the second detection circuit 11, which has been deactivated until this moment. The second detection circuit 11 reads out the complex second accessory data stored in the storage medium 17, i.e., the non-volatile memory, and evaluates the second accessory data. The data is compared to data stored in the second detection circuit 11, and the checksum included in the second accessory data is used to check if an error occurred during transmission. If the second accessory data is coded data, the evaluation includes encoding. If the result of the comparison is positive and no error has occurred during transmission, the second detection circuit 11 sends a positive result to the controller 14. If the evaluation is not positive, i.e., the transmitted data does not match the stored data of the second detection device 11 or an error has occurred during transmission, a negative result can be sent to the controller 14. This negative result can be used to indicate the occurrence of an error.

If the controller 14 receives a positive result of the second detection device 11, the controller 14 activates the up to then deactivated power supply 15 to apply a supply power at the supply contact 7.

In this embodiment, the supply voltage supplies the sensor circuit 13 with electrical power. Measurement signals measured by means of the sensor circuit 13 can be transmitted to the measurement circuit 12, which evaluates these signals.

To check, if the accessory is still connected to the main device 2, the first detection step and preferably the second detection step are repeated continuously, preferably at time intervals. If the result sent from the first detection circuit 10 or the second detection circuit 11 is negative, the controller 14 deactivates the power supply.

In this embodiment, the supply contact 7, the measurement contacts 8 and the detect contacts 6a, 6b of the main device 2 and/or the accessory 3 are exposed electrical contacts with little or no recess, which are simple, robust, easy to clean and to disinfect, and which are touchable by a hand 18. However, without an accepted accessory 3 mounted on the main device 2, no voltage is applied to the supply contact 7 of the main device 2, preventing a user or a patient from physical harm.

In an alternative embodiment, the second storage medium 17 is a programmable digital memory, which allows reading and writing to this memory. Successfully reading, writing and re-reading of the second detection circuit 11 provides an extra level of certainty.

In an alternative embodiment, the first storage medium 16 is an inductance, a capacitor, or an analog circuit.

In a further alternative embodiment, the first storage medium 16 is a complex analog electric circuit including at least one memristor. Data or even complex data can be stored in the at least one memristor, which could be read out by the first detection circuit.

In a further alternative embodiment, the storage medium 17 comprises an accessory controller *20* and a memory *21*, in which complex second accessory data is stored, which can be read out by the accessory controller *20*. In this case, in the second detection step, the second detection circuit 11 sends a request to the accessory controller *20* requesting to transmit second complex accessory data, upon which, if the request is valid, the accessory controller *20* reads out the non-volatile memory *21* and transmits the second complex accessory data to the second detection circuit 11.

Furthermore, it possible to omit one of the two detection steps and to keep only one detection step, in which complex accessory data is received and evaluated by the detection device 9. In this case, one of the two detection circuits 10, 11 and storage mediums 16, 17 can be omitted. On the other hand, it is also possible to provide more than two detection steps.

The assembly according to the invention can be used for a wide variety of applications. However, medical applications are preferred. For example, the assembly can be a medical device attached to a bedside of a patient or to be carried by or to be attached to a patient. In the latter case, one part, preferrably the accessory, can be left being attached to the patient, while the other part, preferrably the main device, can be connected and disconnected. This allows to disconnect the main device for battery charging, for example.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. Any reference signs in the claims should not be construed as limiting the scope.

The invention claimed is:

1. An [assembly,] *accessory device for use with a main device, the accessory device* comprising:

[an accessory, including:]

a sensor *circuit for performing patient monitoring*;

at least one data store that stores first *accessory data* and second *accessory* data; and an accessory connector, which includes*:* one or more supply contacts connected with the sensor *circuit,* and

[a] first and second detect contacts connected with the at least one data store; [and a main device comprising including:] *wherein the accessory connector is configured to connect with* a main device connector [which includes] *of the main device, the main device connector including* one or more supply contacts which are configured to connect electrically with the [accessory connector] one or more supply contacts *of the accessory connector* and [a] first and second detect contacts which are configured to connect electrically with the [accessory] first and second detect contacts, respectively*, of the accessory connector*; *and*

[at least one detection device, which,] *wherein,* in response to the main and accessory connectors connecting [via the accessory and main device contacts], [receives] *a detection device of the main device reads the* first accessory data from the at least one [accessory] data store *of the accessory device* via the first *detect contacts of the* main device and *the first detect contacts of the* accessory [detect contacts] *device*, [and evaluates the first accessory data,] and in response to a positive evaluation of the first accessory data *by the main device indicating the accessory device is authenticated*, *the detection device of the main device* reads *the* second accessory data from the at least one [accessory] data store *of the accessory device* via the second *detect contacts of the* main device and *the second detect contacts of the* accessory [detect contacts and evaluates the second accessory data;] *device* and*, in response to a positive evaluation of the second accessory data by the main device indicating the accessory device is authenticated,* a power supply [which] *of the main device* supplies power to *the sensor circuit of the accessory device via* the one or more supply contacts of the *main* device connector [in response to a positive evaluation of the second accessory data] *and the one or more supply contacts of the accessory connector*.

2. The [assembly] *accessory device* according to claim 1, wherein*:* the *at least one* data store includes a first data store which [provides] *stores* the first accessory data and a second data store which stores the second accessory data*;* and the [at least one detect contact of the accessory connector includes a] first detect contact *is* connected with the first data store and [a] *the* second detect contact *is* connected with the second [accessory] data store.

3. The [assembly] *accessory device* according to claim 1, wherein the at least one [accessory] data store includes an electric component and a digital memory, the first accessory data including an impedance of the electric component and the second accessory data including digital data stored in the digital memory.

4. An assembly, comprising:

a main device;

an accessory *device* connectable to the main device;

the accessory *device* comprising an accessory connector for mating with a device connector of the main device, the accessory connector and the device connector each comprising one or more supply contacts for transmitting electric power from the main device to the accessory *device*;

the main device comprising at least one detection device, [if] *wherein upon* connecting the accessory *device* to the main device *via mating of the accessory connector and the device connector*, the *at least one* detection device receives and evaluates first accessory data stored by the accessory *device* and, after receiving and evaluating the first accessory data, receives and evaluates second accessory data stored by the accessory *device*, and, by a positive evaluation of at least the second accessory data *indicating the accessory device is authenticated*, enables applying [a] *electrical* power at the *one or more* supply contacts of the device connector, wherein the accessory *device* and the main device each comprise connecting first and second detect contacts, wherein the first accessory data is transmitted by the connected first detect contacts and the second accessory data is transmitted by the connected second detect contacts of the main device and the accessory *device*.

5. The assembly according to claim 4, wherein the second accessory data is stored in an accessory memory *of the accessory device*.

6. The assembly according to claim 4, wherein the accessory *device* comprises an accessory controller wherein, [if] *upon* connecting the accessory *device* to the main device *via mating of the accessory connector and the device connector*, main device data is transmitted from the detection device to the accessory controller, the accessory controller evaluating the main device data and transmitting the second accessory data to the detection device.

7. The assembly according to claim 4, wherein the at least one detection device receives the second accessory data only if the evaluation of the first accessory data is positive *indicating the accessory device is authenticated*.

[8. The assembly according to claim 4, wherein the first accessory data is stored in at least one electric or electronic component.]

9. The assembly according to claim 4, wherein the at least one detection device includes a first detection circuit for receiving the first accessory data and a second detection circuit for receiving the second accessory data.

10. The assembly according to claim 4, wherein the second accessory data comprises at least 16 bits.

11. The assembly according to claim 4, wherein the second accessory data is digital [complex] data *comprising a checksum or a hash sum*.

12. The assembly according to claim 4, wherein the accessory *device* comprises a sensor circuit, the main device comprises a measurement circuit, and the accessory *device* and the main device each comprise a measurement contact, wherein by connecting of the accessory *device* to the main device *via mating of the accessory connector and the device connector,* the measurement contacts are connected, enabling transmitting of measurement data from the sensor circuit to the measurement circuit.

13. The assembly according to claim 4, wherein the main device comprises a controller for controlling the at least one detection device, a measurement circuit and/or a power supply for applying a supply voltage at the *one or more* supply [contact] *contacts* of the main device.

14. The assembly according to claim 4, wherein at least the *one or more* supply contacts of the main device [is an] *are* exposed [contact touchable by hand] *contacts*.

15. A method for connecting an accessory *device* to a main device, the accessory *device* including an accessory connector for mating with a device connector of the main device, the accessory connector and the device connector each including one or more supply contacts for transmitting electric power from the main device to the accessory *device*, and first and second detect contacts for transmitting accessory data from the accessory *device* to the main device, the main device [comprises] *further* including a detection device, the method including:

transmitting first accessory data stored by the accessory *device* to the detection device via the first detect contacts when connecting the accessory *device* to the main device;

evaluating the first accessory data;

when the evaluation of the first accessory data is positive *indicating the accessory device is authenticated*, transmitting second accessory data stored by the accessory *device* to the detection device via the second detect contacts;

evaluating the second accessory data;

when the evaluation of the second accessory data is positive *indicating the accessory device is authenticated*, enabling application of a supply voltage via the one or more supply contacts of the device connector.

16. The method according to claim 15, further including:

transmitting measurement data from a sensor circuit of the accessory *device* to a measurement circuit of the main device wherein the accessory *device* and the main device each *further* comprise a measurement contact, and transmission is enabled by connecting the measurement contacts.

*17. An accessory device for use with a main device that has a main device connector and is configured to perform accessory detection including reading first data via the main device connector, reading second data via the main connector responsive to positive evaluation of the first data by the main device indicating the accessory device is authenticated, and delivering power to the accessory device via the main device connector responsive to positive evaluation of the second data by the main device indicating the accessory device is authenticated, the accessory device comprising:*

*a sensor circuit for performing patient monitoring;*

*a data store that stores first accessory data and second accessory data; and*

*an accessory connector including:*

*power supply contacts connected with the sensor circuit and configured to connect electrically with the main device connector to receive power delivered to the accessory device from the main device,*

*first detect contacts connected with the data store and configured to connect electrically with the main device connector to enable the main device to read first data as the first accessory data stored in the data store, and*

*second detect contacts connected with the data store and configured to connect electrically with the main device connector to enable the main device to read second data as the second accessory data stored in the data store;*

*wherein the first accessory data read as first data via the main device connector by the main device produces positive evaluation by the main device indicating the accessory device is authenticated; and*

*wherein the second accessory data read as second data via the main device connector by the main device produces positive evaluation by the main device indicating the accessory device is authenticated.*

*18. The accessory device according to claim 17 wherein the data store includes an electric component and a digital memory, the first accessory data including an impedance of the electric component and the second accessory data including digital data stored in the digital memory.*

*19. The accessory device according to claim 18 wherein the digital memory is a non-volatile digital memory.*

*20. The accessory device according to claim 18 wherein the digital memory is a programmable digital memory.*

*21. The accessory device according to claim 18 wherein the digital memory is a ROM, EPROM, EEPROM, or FLASH memory.*

*22. The accessory device according to claim 18 wherein the digital accessory data comprises a checksum or hash sum.*

*23. The accessory device according to claim 18 wherein the digital accessory data stored in the digital memory includes control data and the medical device is configured to perform said medical accessory detection further including controlling the medical accessory in accordance with the control data.*

* * * * *